United States Patent
Shu et al.

(10) Patent No.: US 10,931,523 B2
(45) Date of Patent: Feb. 23, 2021

(54) CONFIGURATION CHANGE MONITORING IN SOFTWARE-DEFINED NETWORKING ENVIRONMENTS

(71) Applicant: VMware, Inc., Palo Alto, CA (US)

(72) Inventors: Ming Shu, Beijing (CN); Benli Ye, Beijing (CN); Da Wan, Beijing (CN); Qiong Wang, Beijing (CN); Donghai Han, Beijing (CN); Qiao Huang, Beijing (CN); Xu Wang, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/351,542

(22) Filed: Mar. 13, 2019

(65) Prior Publication Data

US 2020/0235991 A1 Jul. 23, 2020

(30) Foreign Application Priority Data

Jan. 23, 2019 (WO) ................ PCT/CN2019/072819

(51) Int. Cl.
*G06F 15/177* (2006.01)
*H04L 12/24* (2006.01)
*H04L 12/26* (2006.01)

(52) U.S. Cl.
CPC .......... *H04L 41/0816* (2013.01); *H04L 41/20* (2013.01); *H04L 43/14* (2013.01); *H04L 43/50* (2013.01)

(58) Field of Classification Search
CPC ..... H04L 41/0816; H04L 41/20; H04L 43/14; H04L 43/50
USPC .................................................. 709/220–222
See application file for complete search history.

(56) References Cited

U.S. PATENT DOCUMENTS

| 7,287,069 | B1 * | 10/2007 | Kavasseri | H04L 41/0816 |
| | | | | 709/221 |
| 9,563,647 | B1 * | 2/2017 | Chopra | G06F 11/3051 |
| 10,554,529 | B2 * | 2/2020 | Kanevsky | H04L 41/0681 |
| 10,630,547 | B2 * | 4/2020 | Srinivas | H04L 41/0816 |
| 2016/0094383 | A1 * | 3/2016 | Wang | H04L 41/12 |
| | | | | 709/221 |
| 2018/0248905 | A1 * | 8/2018 | Cote | H04L 41/0677 |
| 2019/0222481 | A1 * | 7/2019 | Hira | H04L 43/10 |

* cited by examiner

*Primary Examiner* — Bharat Barot
(74) *Attorney, Agent, or Firm* — Su IP Consulting

(57) ABSTRACT

Example methods and systems for a network management entity to perform configuration change monitoring. One example method may comprise receiving a request to monitor a datapath to which a configuration change is applicable. The datapath may include multiple network elements. The method may also comprise instructing the first host to inject, at a first network element, one or more trace packets for transmission along the datapath to a second network element. The method may further comprise: obtaining state information associated with the configuration change, and detecting that an operating condition associated with the datapath is affected by the configuration change based on the state information.

21 Claims, 7 Drawing Sheets

CONFIGURATION CHANGE MONITORING IN SOFTWARE-DEFINED NETWORKING ENVIRONMENTS

CROSS-REFERENCE TO RELATED APPLICATION

The present application claims the benefit of Patent Cooperation Treaty (PCT) Application No. PCT/CN2019/072819, filed Jan. 23, 2019, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtual machines running different operating systems may be supported by the same physical machine (also referred to as a "host"). Each virtual machine is generally provisioned with virtual resources to run an operating system and applications. The virtual resources may include central processing unit (CPU) resources, memory resources, storage resources, network resources, etc. In practice, configuration changes may be applied to hosts in the SDN environment. However, some configuration changes are susceptible to errors, which may be challenging to identify and result in system downtime and performance degradation.

DETAILED DESCRIPTION

Figure 1:
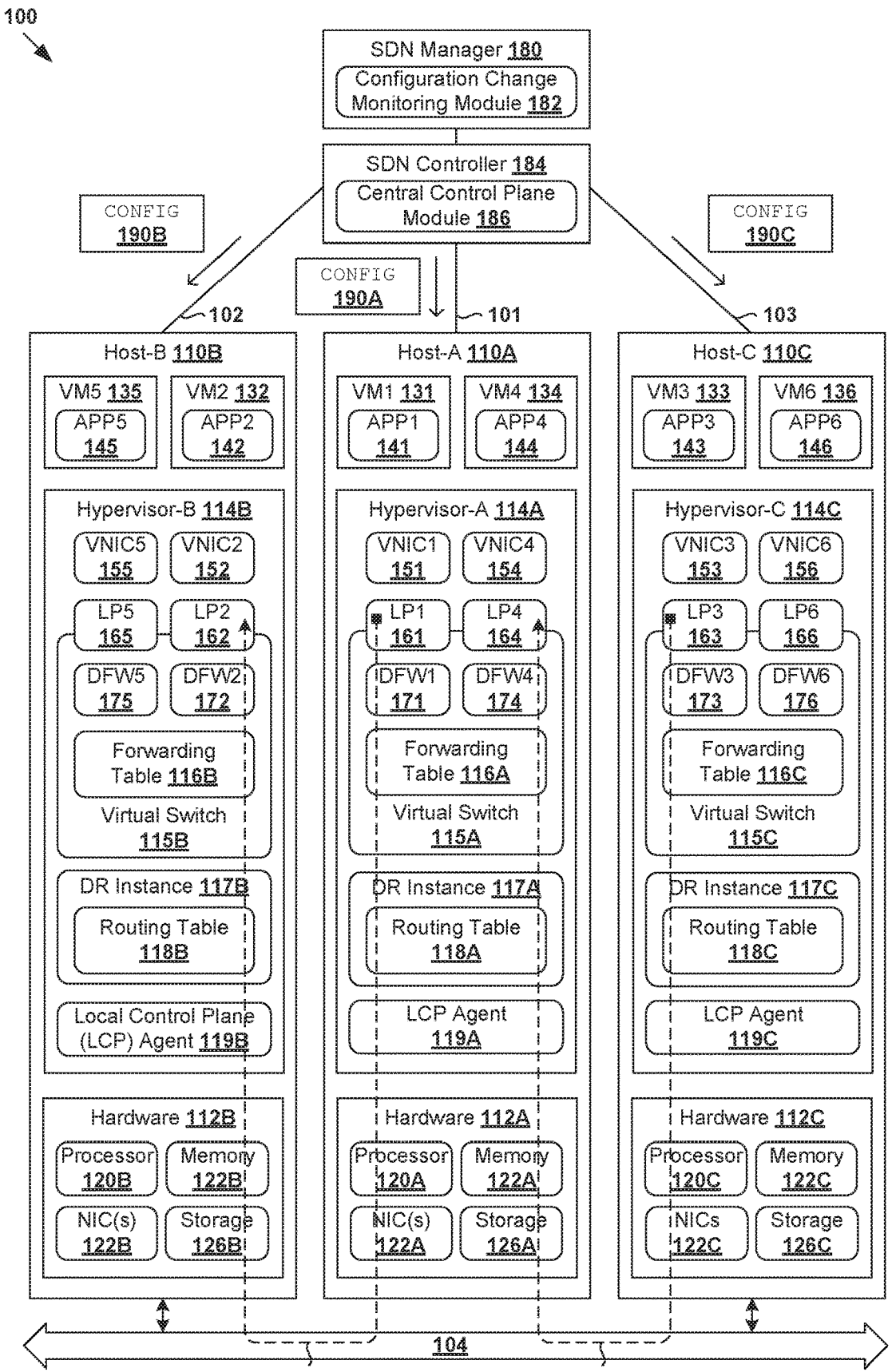
FIG. 1 is a schematic diagram illustrating an example software-defined networking (SDN) environment in which configuration change monitoring may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to configuration change management will now be explained in more detail using FIG. 1, which is a schematic diagram illustrating example software-defined networking (SDN) environment 100 in which configuration change monitoring may be performed. It should be understood that, depending on the desired implementation, SDN environment 100 may include additional and/or alternative components than that shown in FIG. 1. SDN environment 100 includes multiple hosts 110A-C that are inter-connected via physical network 104. In practice, SDN environment 100 may include any number of hosts (also known as a "host computers", "host devices", "physical servers", "server systems", "transport nodes," etc.), where each host may be supporting tens or hundreds of virtual machines (VMs).

Each host 110A/110B/110C may include suitable hardware 112A/112B/112C and virtualization software (e.g., hypervisor-A 114A, hypervisor-B 114B, hypervisor-C 114C) to support various VMs. For example, hosts 110A-C may support respective VMs 131-136 (see also FIG. 2). Hypervisor 114A/114B/114C maintains a mapping between underlying hardware 112A/112B/112C and virtual resources allocated to respective VMs. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, VMs 131-136 support respective applications 141-146 (see "APP1" to "APP6"). The virtual resources may include virtual CPU, guest physical memory, virtual disk, virtual network interface controller (VNIC), etc. Hardware resources may be emulated using virtual machine monitors (VMMs). For example in FIG. 1, VNICs 151-156 are virtual network adapters for VMs 131-136, respectively, and are emulated by corresponding VMMs (not shown for simplicity) instantiated by their respective hypervisor at respective host-A 110A, host-B 110B and host-C 110C. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical port. For example, logical switch ports 161-166 (see "LP1" to "LP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of a corresponding virtualized computing instance (e.g., when the source host and destination host do not have a distributed virtual switch spanning them).

To protect VMs 131-136 against security threats caused by unwanted packets, hypervisors 114A-C may implement firewall engines to filter packets. For example, distributed firewall engines 171-176 (see "DFW1" to "DFW6") are configured to filter packets to, and from, respective VMs 131-136 according to firewall rules. In practice, network packets may be filtered according to firewall rules at any point along a datapath from a VM to corresponding physical NIC 124A/124B/124C. In one embodiment, a filter component (not shown) is incorporated into each VNIC 151-156 that enforces firewall rules that are associated with the endpoint corresponding to that VNIC and maintained by respective distributed firewall engines 171-176.

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM2 132 on host-B 110B may be connected to the same logical switch and located on the same logical layer-2 segment, such as a segment with VXLAN network identifier (VNI)=6000.

SDN manager 180 and SDN controller 184 are example network management entities in SDN environment 100. One example of an SDN controller is the NSX controller component of VMware NSX® (available from VMware, Inc.) that operates on a central control plane. SDN controller 184 may be a member of a controller cluster (not shown for simplicity) that is configurable using SDN manager 180 operating on a management plane. Network management entity 184/180 may be implemented using physical machine(s), VM(s), or both. Logical switches, logical routers, and logical overlay networks may be configured using SDN controller 184, SDN manager 180, etc. To send or receive control information, local control plane (LCP) agent 119A/119B/119C on host 110A/110B/110C may interact with central control plane (CCP) module 186 at SDN controller 184 via control-plane channel 101A/101B/101C.

Hosts 110A-C may also maintain data-plane connectivity among themselves via physical network 104 to facilitate communication among VMs located on the same logical overlay network. Hypervisor 114A/114B/114C may implement a virtual tunnel endpoint (VTEP) (not shown) to encapsulate and decapsulate packets with an outer header (also known as a tunnel header) identifying the relevant logical overlay network (e.g., using a VXLAN or "virtual" network identifier (VNI) added to a header field). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B), hypervisor-C 114C implements a third VTEP with (IP-C, MAC-C, VTEP-C), etc. Encapsulated packets may be sent via an end-to-end, bi-directional communication path (known as a tunnel) between a pair of VTEPs over physical network 104.

In practice, configuration changes (see 190A-C) may be applied to respective hosts 110A-C for various purposes. For example, a user (e.g., network administrator) may update firewall rules for filtering traffic to and from logical ports 161-166. Configuration changes may also be made to update predefined profiles that are applicable to a group of logical components, to reconfigure logical networks connecting VMs 131-136, etc. However, configuration changes are susceptible to errors. For example, configuration changes 190A-C may include unknown human errors that lead to undesirable or unexpected behaviors, such as along a first datapath (see 191) between VMs 131-132 and a second datapath (see 192) between VMs 133-134.

Conventionally, some users rely on primitive or simple tools for troubleshooting purposes but these tools might be inefficient and insufficient, especially as the complexity and scale of SDN environment 100 increases. Another conventional approach is to analyze log information (sometimes manually) to identify the origin of the error. However, since there is usually a delay between the time when an error first occurs and the time the error is reported, there might be a large volume of irrelevant log information to analyze, which makes it challenging to identify the culprit.

Configuration Change Monitoring

According to examples of the present disclosure, configuration change monitoring may be implemented in an automated manner to improve efficiency and system performance. In more detail, FIG. 2 is a schematic diagram illustrating example configuration change monitoring 200 in the example in FIG. 1. The example in FIG. 2 will be discussed using FIG. 3, which is a flowchart of example process 300 for a network management entity to perform configuration change monitoring in SDN environment 100. Example process 300 may include one or more operations, functions, or actions illustrated by one or more blocks, such as 310 to 350. The various blocks may be combined into fewer blocks, divided into additional blocks, and/or eliminated depending on the desired implementation.

In practice, example process 300 may be implemented using any suitable "network management entity," such as SDN manager 180 using configuration change monitoring module 182, SDN controller 184 using CCP module 186, etc. In the following, host-A 110A will be used as an example "first host," host-B 110B as a "second host," VM1 131 as a "first virtualized computing instance," VM2 132 as a "second virtualized computing instance," LP1 161 as a "first network element," and LP2 162 as a "second network element." Although the terms "first" and "second" are used herein to describe various elements, these elements should not be limited by these terms. These terms are used to distinguish one element from another. For example, a first element may be referred to as a second element, and vice versa.

Throughout the present disclosure, the term "network element" located along a datapath may refer generally to any suitable entity that is capable of performing monitoring-related actions. A "network element" may be a logical or software entity, such as a logical port (e.g., 161-166), logical switch, logical router port, logical router, distributed firewall engine (e.g., 171-176), VNIC (e.g., 151-156), etc. Alternatively or additionally, a "network element" may also be a physical entity, such as a physical NIC (e.g., 124A-C), etc. Each network element along the datapath may be act as an observation point for monitoring configuration changes.

Figure 2:
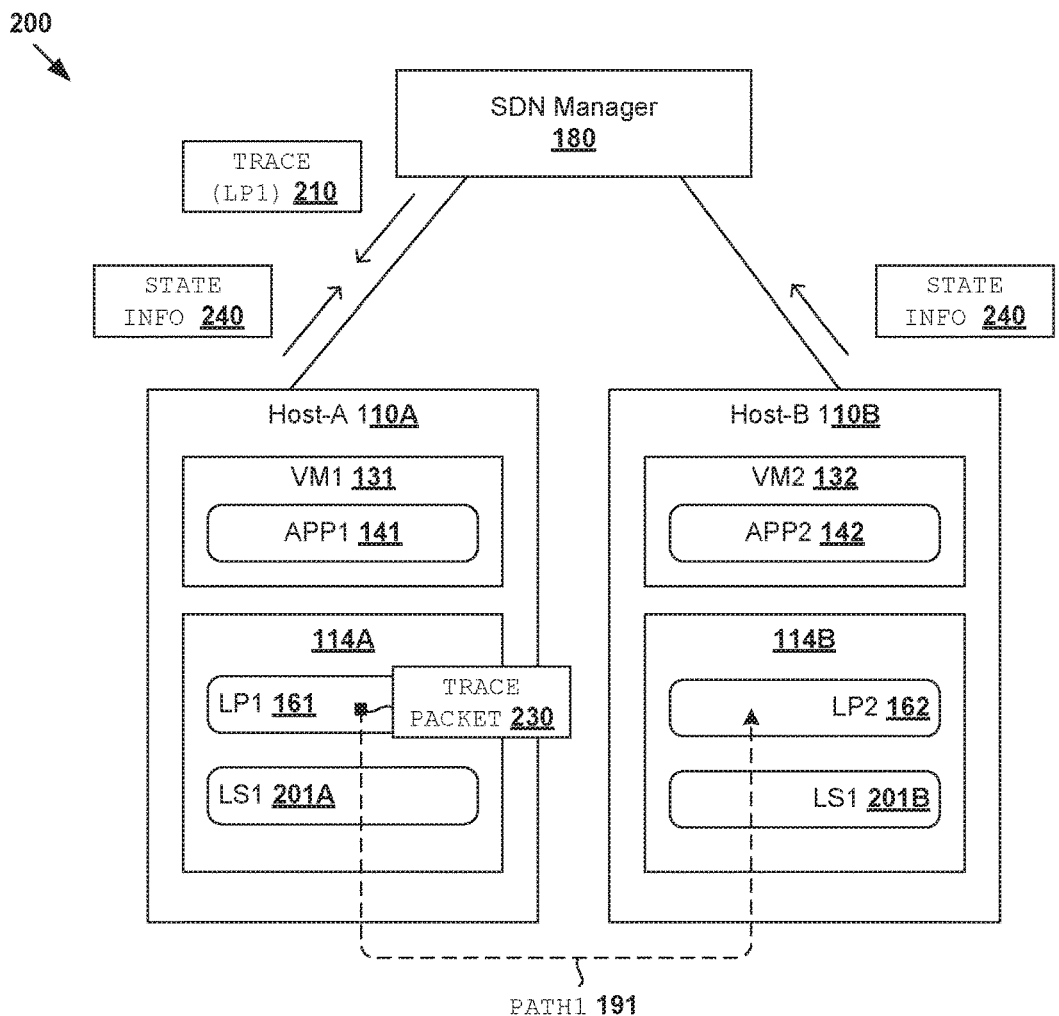
FIG. 2 is a schematic diagram illustrating example configuration change monitoring in the example in FIG. 1.
Figure 3:
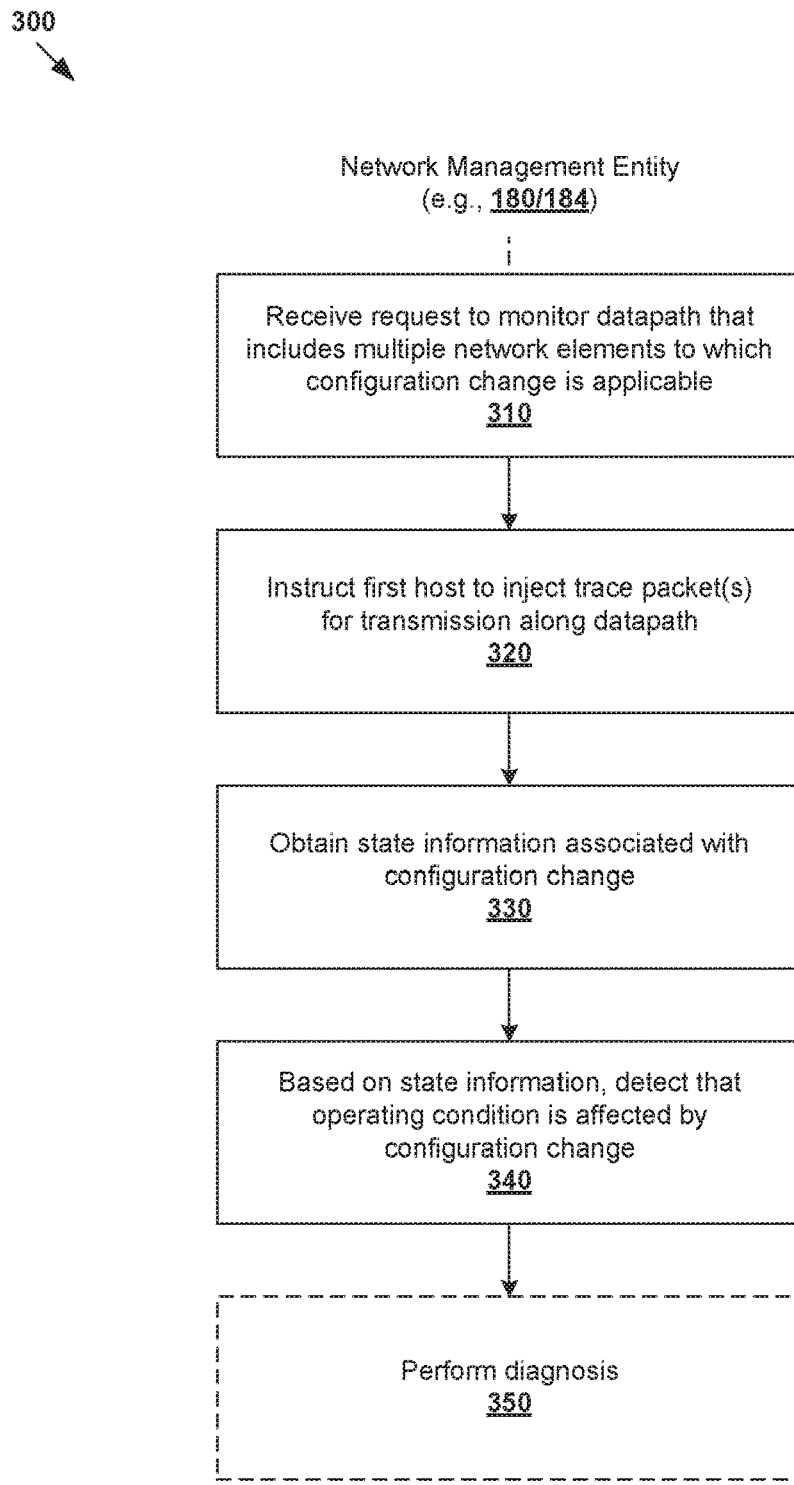
FIG. 3 is a flowchart of an example process for a network management entity to perform configuration change monitoring in an SDN environment.

At 310 in FIG. 3, SDN manager 180 may receive a request to monitor a datapath to which a configuration change is applicable. In the example in FIG. 2, datapath 191 includes network elements in the form of LP1 161 and LS1 201A supported by host-A 110A and LP2 162 and LS1 201B supported by host-B 110B. Here, LS1 201A-B collectively represents a logical switch that connects VMs 131-132 via respective logical ports 161-162. As explained using FIG. 1, logical switches 201A-B may be collectively implemented by virtual switches 115A-B and represented internally using forwarding tables 116A-B.

As used herein, the term "configuration change" may refer generally to any suitable modification or update to a (virtual or physical) machine's software, hardware, firmware, or any combination thereof. In the example in FIG. 2, configuration change 220 may be applied to LP1 161, LS1 201A-B and LP2 162 located along datapath 191. Depending on the desired implementation, configuration change 220 may include multiple transactions with respective transaction identifiers (TIDs) labelled "T1" to "T5" (see 221-225). Each transaction may further include any suitable number of operations (e.g., labelled "op-1" to "op-M1" for T1).

At 320 in FIG. 3, SDN manager 180 may instruct (see 210) host-A 110A to inject, at LP1 161, one or more trace packets (see 230) for transmission along datapath 191 to LP2 162. At 330, SDN manager 180 may obtain state information (see 240) associated with the configuration change. At 340 in FIG. 3, based on the state information, SDN manager 180 may detect that an operating condition associated with the datapath is affected by the configuration change.

In the example in FIG. 2, trace packet 230 may be injected at LP1 161 to gather state information 240 associated with configuration change 220. In particular, each network element along datapath 191 may generate and report state information that identifies the latest transaction completed at that network element. For example, the latest transaction may be "T2" at LP1 161 (see 241), LS1 201A (see 242), LS1 201B (see 243) and LP2 162 (see 244). In response to receiving state information 240 from host-A 110A and/or host-B 110B, SDN manager 180 may determine that an operating condition associated with datapath 191 is affected by configuration change 220.

Any suitable "operating condition" may be detected, such as by testing assertion(s) representing desired operating condition(s) associated with datapath 191. In one example, block 340 may involve testing the validity of a reachability-based assertion specifying whether LP2 162 is reachable from LP1 161 (i.e., datapath=UNBLOCKED), or otherwise (i.e., datapath=BLOCKED). In another example, block 340 may involve testing the validity of a performance-based assertion that specifies a performance threshold to be satisfied by datapath 191. Any additional and/or alternative assertion(s) may be used.

Depending on the desired implementation, in response to detecting that the operating condition is affected, SDN manager 180 may perform a diagnosis (see 350 in FIG. 3; shown in dashed line) to identify particular transaction(s) of configuration change 220 that have possibly affected the operating condition. As will be discussed using FIGS. 4-6, block 350 may involve obtaining further state information associated with configuration change 220. Transaction(s) that have possibly affected the operating condition may be identified based on at least one of the following: (a) state information 240 based on which the affected operating condition is detected, and (b) further state information obtained after the affected operating condition is detected.

Using examples of the present disclosure, operating condition(s) that are affected by configuration change 220 may be detected automatically, for example, as configuration change 220 is being deployed. This should be contrasted against conventional approaches that rely on users to detect such problems and report them to network administrators. In some cases, the problems might not be identifiable until a much later time, such as after an erroneous configuration is deployed in a production environment. By detecting the affected operating condition(s) based on state information 240, examples of the present disclosure may be implemented to improve the efficiency of troubleshooting and reduces possible system downtime. Various examples will be discussed below.

Configuration Change

Figure 4:
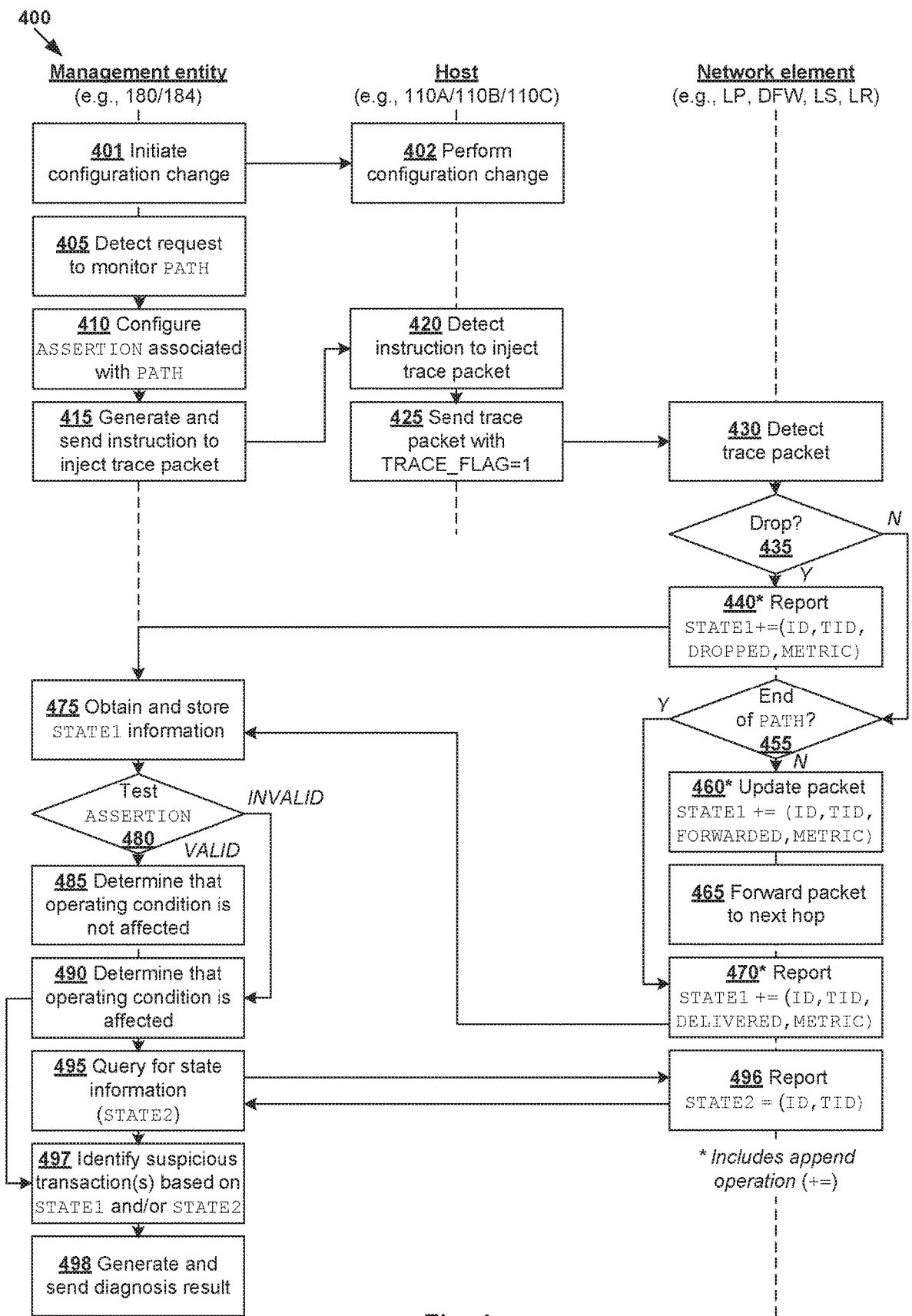
FIG. 4 is a flowchart of an example detailed process for configuration change monitoring in an SDN environment.

FIG. 4 is a flowchart of example process 400 of configuration change monitoring in SDN environment 100. Example process 400 may include one or more operations, functions, or actions illustrated at 401 to 498. The various operations, functions or actions may be combined into fewer blocks, divided into additional blocks, and/or eliminated depending on the desired implementation. Example process 400 may be performed by any suitable network management entity 180/184. The example in FIG. 4 will be discussed using FIG. 5, which is a schematic diagram illustrating first example 500 of configuration change monitoring in SDN environment 100 according to the example in FIG. 4.

Figure 5:
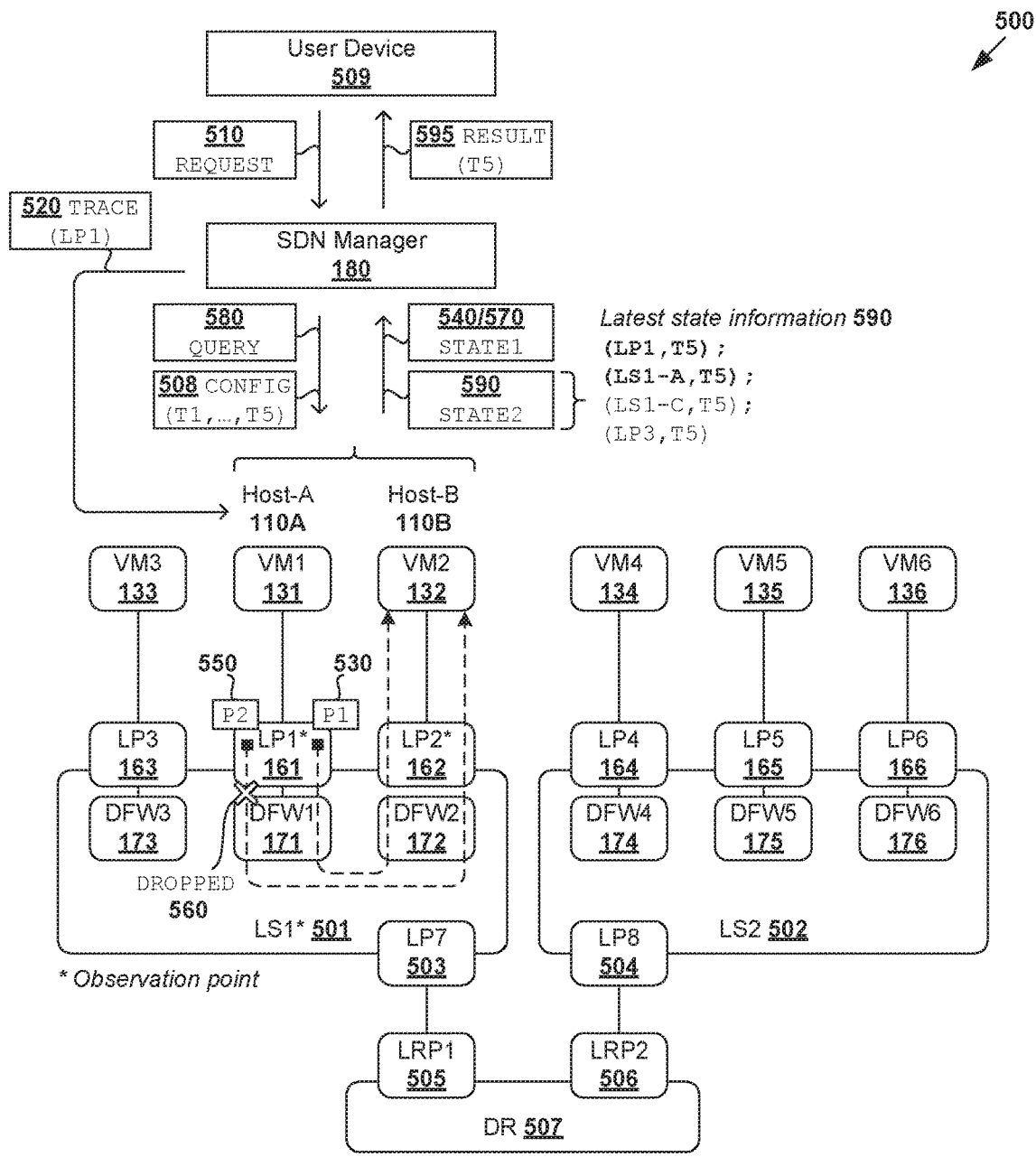
FIG. 5 is a schematic diagram illustrating a first example of configuration change monitoring in an SDN environment according to the example in FIG. 4.

In the example in FIG. 5, an example logical network topology connecting various VMs 131-136 in FIG. 1 is shown. One group of VMs 131-133 on respective hosts 110A-C are connected via a logical switch denoted as LS1 501, which represents LS1 201A-B in FIG. 2. Another group of VMs 134-136 are connected via another logical switch denoted as LS2 502. Logical switches 501-502, which are connected to DR 507, may be collectively implemented by virtual switches 115A-C and represented internally using forwarding tables 116A-C. Further, DR 507 may be collectively implemented by DR instances 117A-C and represented internally using routing tables 118A-C. Logical switch ports 503-4 and logical router ports 506-507 provide connectivity to DR 507.

At 401 and 402 in FIG. 4, SDN manager 180 may initiate a configuration change by generating and sending control information (see 508 in FIG. 5) to relevant hosts 110A-B. For example, the configuration change may be to change firewall rule(s) to be implemented by DFW1 171 associated with LP1 161. Referring to 220 in FIG. 2, a configuration change may include multiple (N) transactions that are pushed towards a datapath directly or indirectly. Each transaction may be assigned with transaction ID=Ti (i≤N), and further include multiple operations to be performed on various network elements located along the datapath.

In the example in FIG. 5, the configuration change for datapath 191 between on LP1 161 and LP2 162 includes five transactions with respective IDs "T1" to "T5." In practice, the transactions may be realized in an atomic manner. There is usually a delay between (a) the time at which a transaction is applied and (b) the time at which the transaction is completed or realized. In this case, the progress of the configuration change may be tracked using TIDs. For example, the most recent or latest TID (Ti) may be used to indicate that all transaction(s) up to Ti (e.g., T1 and T2 for i=2) have been realized at a particular network element.

Depending on the desired implementation, the configuration change may be initiated at block 401 based on an instruction received user device 509 (e.g., operated by a network administrator). The instruction may be received via any suitable interface supported by SDN manager 180, such as graphical user interface (GUI), command-line interface (CLI), application programming interface (API) calls, etc. The user's instruction may be generated manually or programmatically (e.g., script or batch programming).

Trace Packets

According to examples of the present disclosure, network elements on a datapath may be used as observation points to monitor configuration changes. For example in FIG. 5, logical ports LP1 161 and LP2 162, and logical switch LS 501 may be used as observation points to report state information associated with the configuration change initiated at block 401 in FIG. 4. An example monitoring session may be configured as follows. The term "trace packet" may refer generally to any suitable control packet that may be sent along a datapath to cause network element(s) to generate state information associated with a configuration change.

At 405 in FIG. 4, SDN manager 180 receives a request (see 510 in FIG. 5) to monitor a datapath between LP1 161 on host-A 110A and LP2 162 on host-B 110B during a configuration change. In practice, request 510 may be received from user device 509 (e.g., operated by a network administrator) via any suitable interface supported by SDN manager 180, such as GUI, CLI, API calls, etc. Request 510 may be generated manually or programmatically. Request 510 may be used to initiate both the configuration change and the monitoring session.

At 410 in FIG. 4, an assertion associated with the datapath may be configured (separately from or together with request 510). Here, the term "assertion" may refer generally to a desired operating condition associated with the datapath. For example, a reachability-based assertion may specify that "datapath=BLOCKED" such that LP2 162 is unreachable from LP1 161. In another example, the reachability-based assertion may specify "datapath=UNBLOCKED" such that LP2 162 is reachable from LP1 161. Alternatively or additionally, a performance-based assertion may specify a performance threshold to be satisfied by the datapath.

The performance threshold may be defined using any suitable performance metric information, such as latency, throughput, packet loss, packet size, jitter, number of transmitted or received units of data (bytes), number of packets transmitted or received, any combination thereof, etc. For example, latency may refer generally to the time required to transmit a packet belonging to the flow from a source to a destination, such as round trip time (RTT), one-way latency, etc. Throughput may refer generally to the amount of data being sent from the sender to the recipient, such as the quantity of data per unit of time. Packet loss may refer generally to the number of packets lost per a fixed number (e.g., 100) of packets sent. Jitter may refer generally to a variance in latency over time.

The number of packets transmitted or received may be used to calculate a packet drop rate between a pair of checkpoints. For example, if the number of packets transmitted by a source (e.g., LP1 161) is W1 and the number of packets received by a destination (e.g., LP2 162) is W2, the difference (W1−W2) may represent the number of dropped packets. Depending on the desired implementation, a particular metric value may be a time average value (i.e., average of latency measurements over a period of time), etc. In practice, the performance threshold (e.g., maximum latency) may be configured manually by a network administrator, programmatically (e.g., based on service level agreements), etc.

At 415 in FIG. 4, SDN manager 180 generates and sends control information or instruction (see 520 in FIG. 5) to instruct host-A 110A to start monitoring the datapath by periodically injecting, at LP1 161, a trace packet that is destined for LP2 162. At 420 and 425, in response to receiving the control information, host-A 110A proceeds to start monitoring the datapath using trace packets.

A first trace packet (see P1 530) may be sent at a first time point (e.g., t11). A second trace packet (see P2 530) may be sent at a second time point (e.g., t21). Header 532/552 specifies (source IP-1, destination IP-2) associated with respective VMs 131-132. Header 532/552 also includes a flag (e.g., TRACE_FLAG=1) to distinguish trace packet 530/550 from other control or data packets. Flag 534/554 may also cause network element(s) to modify trace packet

530/550 by appending state information associated with the configuration change to trace packet.

Reachability-Based Assertion

In the example in FIG. 5, trace packets may be periodically generated and sent to test the validity of a reachability-based assertion that LP2 162 in reachable from LP1 161 (i.e., datapath=UNBLOCKED). At 430-470 in FIG. 4, in response to detecting trace packet 530/550, each network element along the datapath (LP1-LS1-LS1-LP2) determines whether to drop or forward first trace packet 530 (before reaching the end of the datapath). Three scenarios are shown in the example in FIG. 4. Symbol "+=" (see blocks 440, 460 and 470) represents an operation to append state information generated by a current hop to trace packet 530/550, which might already include state information generated by previous hop(s).

In a first scenario (see 435-440), in response to dropping trace packet 530/550, state information generated by previous hops (if any) and the current hop will be compiled and reported to SDN manager 180. In a second scenario (see 460-465), state information will be appended to first trace packet 530 before forwarding it to the next hop. In a third scenario (see 455 and 470), when trace packet 530/550 has reached the end of the datapath, state information generated by all hops will be compiled and reported to SDN manager 180.

In the example in FIG. 5, the state information may be in the form of (ID, STATUS, TID, METRIC). The "ID" field includes any suitable information identifying its sender, such as a universally unique ID (UUID), name, element type (e.g., physical entity, logical router, logical switch, distributed firewall engine), etc. The "STATUS" field represents a status associated with trace packet 530/550, such as DROPPED, FORWARDED (to next hop), DELIVERED (to destination), etc. The "TID" field represents the ID of the most recently completed transaction. The "METRIC" field may be any suitable metric information for testing a metric-based assertion. One example METRIC is latency, in which case a timestamp may be added to trace packet 530/550. The timestamp may represent the time at which trace packet 530/550 is received, processed or sent by a particular network element.

(a) Operating Condition not Affected

In response to detecting first trace packet 530, LP1 161 appends state information (ID=LP1, STATUS=FORWARDED, TID=T4, timestamp=t11) to payload 536. At LS1 501 on host-A 110A, state information (LS2-A, FORWARDED, T4, t12) is appended to first trace packet 530. At LS1 501 on host-B 110B, state information (LS2-B, FORWARDED, T5, t13) is appended. Finally, at the last hop, LP2 162 reports the state information appended by all previous hops, as well as (LP2, DELIVERED, T5, t14) to SDN manager 180.

At 475 in FIG. 4, state information 540 is obtained and stored. At 480-485, SDN manager 180 detects whether any operating condition is affected by testing the validity of the reachability-based assertion of "datapath=UNBLOCKED" configured at block 410. Since first trace packet 530 is delivered to LP2 162 based on state information (LP2, DELIVERED, T5, t14), SDN manager 180 determines that the assertion remains valid. Based on the chain of (T4, T4, T5, T5) in state information 540, SDN manager 180 may determine that "T1" to "T4" have been completed at LP1 161 and LS1 501 on host-A 110A. At host-B 110B, all transactions have been completed on LP2 162 and LS1 501.

(b) Operating Condition Affected

A second trace packet (see P2 550) is sent at a second time point (e.g., t21). In response to detecting second trace packet 550, LP1 161 decides to drop the packet (see 560). In this case, LP1 161 generates and sends state information (ID=LP1, STATUS=DROPPED, TID=T5, timestamp=t21) to SDN manager 180. At 475, 480 and 490 in FIG. 4, in response to receiving state information (see 570) from LP1 161, SDN manager 180 may determine that the assertion of "datapath=UNBLOCKED" is no longer valid because second trace packet 550 did not reach its destination. In other words, the desired operating condition of the datapath has been affected.

At 497 and 498 in FIG. 4, SDN manager 180 performs a diagnosis to identify suspicious transaction(s) that have possibly affected the operating condition, and reports a diagnosis result to a user. In one example, the suspicious transaction(s) may be identified using state information (see 570) based on which the affected operating condition is detected. For example, state information (LP1, DROPPED, T5, t21) at 570 may be compared with (LP1, FORWARDED, T4, t11) at 540 to determine that the previous working transaction is T4. In this case, SDN manager 180 may identify the new transaction T5 completed at LP1 161 to be a suspicious transaction.

Alternatively or additionally, at 495 and 496 in FIG. 4, SDN manager 180 may obtain further state information (see 590) from the datapath, such as by generating and sending a query (see 580) to hosts 110A-B. Blocks 495-496 may be performed when, for example, SDN manager 180 is unable to identify suspicious transaction(s) based on the available state information 540/570. In the example in FIG. 5, the queried state information includes (LP1, T5) and (LS1, T5) from host-A 110A, and (LS1, T5) and (LP2, T5) from host-B 110B.

SDN manager 180 may then compare state information (see 540) collected using first trace packet 530 with the queried state information (see 590) to determine a diagnosis result. This may involve comparing (a) a first chain=(T4, T4, T5, T5) from state information 540 with (b) a second chain=(T5, T5, T5, T5) from queried state information 590 is then made. Based on the comparison, SDN manager 180 may identify suspicious transaction=T5 that has possibly affected the desired operating condition, particularly when applied to LP1 161 and LS1 501 on host-A 110A. Diagnosis result (see 595) identifying the suspicious transaction (and/or related operations) is then reported.

Performance-Based Assertion

Figure 6:
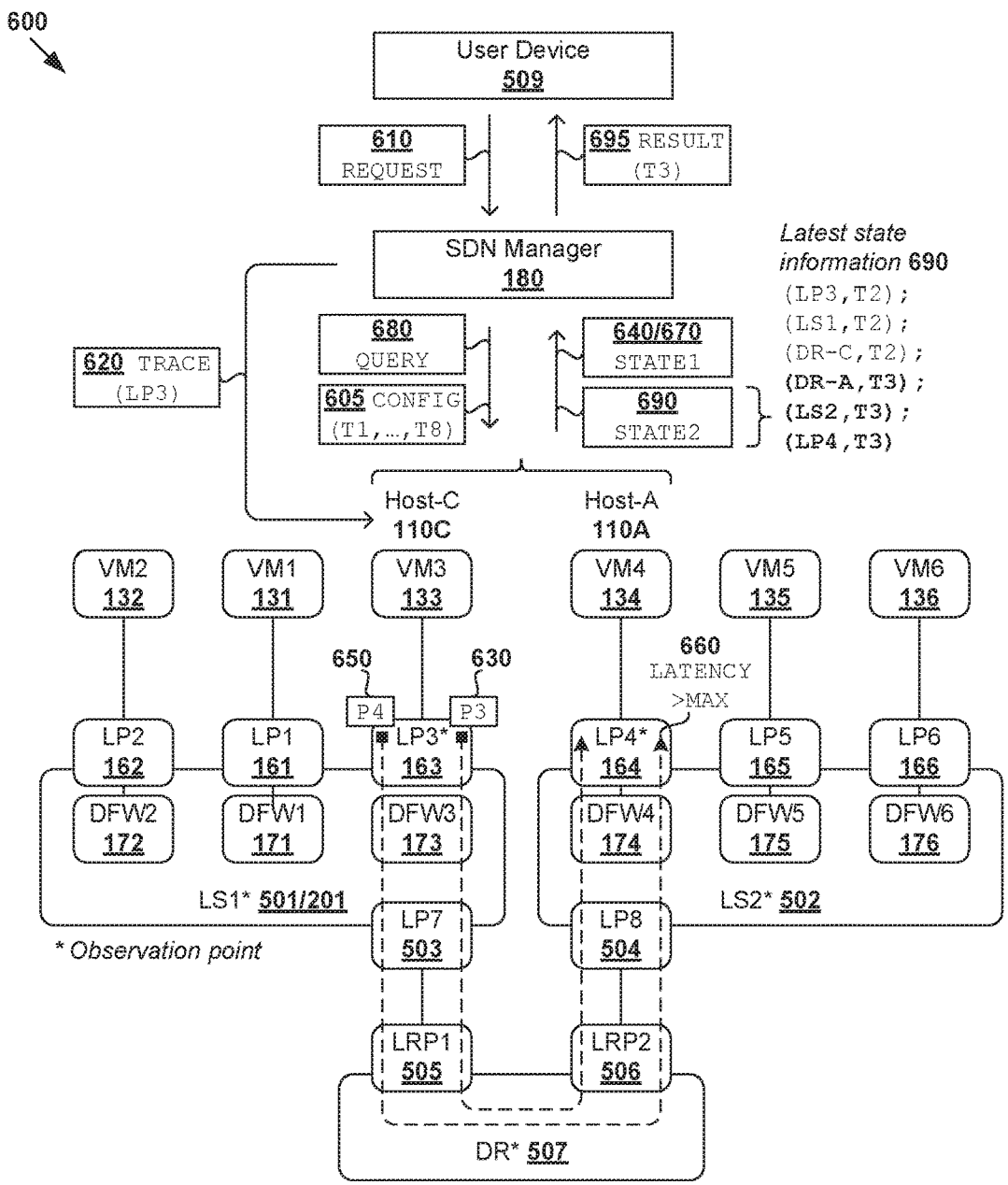
FIG. 6 is a schematic diagram illustrating a second example of configuration change monitoring in an SDN environment according to the example in FIG. 4.

FIG. 6 is a schematic diagram illustrating second example 600 of configuration change monitoring in SDN environment 100 according to the example in FIG. 4. In this example, consider a configuration change that is applicable to a datapath that includes LP3 163, LS1 501, DR 507, LS2 502 and LP4 164. Similar to the example in FIG. 5, SDN manager 180 may instruct host-A 110A and host-C 110C to implement a configuration change that includes multiple transactions (e.g., "T1" to "T8" at 605).

During the configuration change, the datapath may be monitored to test the validity of any suitable assertion(s). In the example in FIG. 6, a reachability-based assertion (e.g., "datapath=UNBLOCKED") and a performance-based assertion (e.g., "latency≤1 ms") are configured. Trace packets may be sent periodically from LP3 163 to LP4 164 to test whether the desired operating conditions are maintained, in that (a) LP4 164 remains reachable from LP3 163, and (b) the end-to-end latency does not exceed a particular latency threshold (e.g., 1 ms).

(a) Operating Condition not Affected

A monitoring session may be initiated based on a user's request (see 610) and control information (see 620) from SDN manager 180. A first trace packet (see P3 630) may be injected at LP3 163 at a first time point. Header 632 specifies (source IP-3, destination IP-4) associated with respective VMs 133-134, and TRACE_FLAG=1 (see 634). LP3 163 updates first trace packet 630 by adding state information (ID=LP3, STATUS=FORWARDED, TID=T2, timestamp=t31) to payload 636. At LS1 501, (LS1, FORWARDED, T2, t32) is appended. Next, (DR-C, FORWARDED, T2, t33) is appended by DR 507 on host-C 110C; (DR-A, FORWARDED, T2, t34) by DR 507 on host-A 110A; and (LS2, FORWARDED, T2, t35) by LS2 502. Finally, LP4 164 reports all state information added by the previous hops, as well as (LP4, DELIVERED, T2, t36). See 640 in FIG. 6.

In response to receiving state information 640, SDN manager 180 determines that the reachability-based assertion (e.g., "datapath=UNBLOCKED") is valid based on (LP4, DELIVERED, T2, t36). The performance-based assertion (e.g., "latency≤1 ms") is also valid based on end-to-end latency (t36−t31≤1 ms). Based on transaction chain=(T2, T2, T2, T2, T2, T2) from state information 640, SDN manager 180 may determine that transactions "T1" and "T2" have been completed.

(b) Operating Condition Affected

A second trace packet (see P4 650) may be injected at LP3 163 at a second time point. Header 652 specifies (source IP-3, destination IP-4), and TRACE_FLAG=1 (see 654). Referring to 670 in FIG. 6, LP3 163 updates second trace packet 650 by adding (LP3, FORWARDED, T2, t41) to payload 656. Next, (LS1, FORWARDED, T2, t42) is appended by LS1 501; (DR-C, FORWARDED, T2, t43) by DR 507 on host-C 110C; (DR-A, FORWARDED, T3, t44) by DR 507 on host-A 110A; and (LS2, FORWARDED, T3, t45) by LS2 502. Finally, at the last hop, LP4 164 reports all the state information added by the previous hops, as well as (LP4, DELIVERED, T3, t46) to SDN manager 180. See 660 in FIG. 6.

In response to receiving state information 670, SDN manager 180 may determine that the reachability-based assertion (e.g., "datapath=UNBLOCKED") is valid because first trace packet 640 reaches LP4 134 based on (LP4, DELIVERED, T3, t46). However, the performance-based assertion (e.g., "latency≤1 ms") is no longer valid based on end-to-end latency (t46−t41>1 ms). See 660 in FIG. 6.

In response to detecting that the latency threshold is not satisfied, SDN manager 180 performs a diagnosis to identify suspicious transaction(s) that have possibly caused the increase in the end-to-end latency. This may involve comparing (a) first chain=(T2, T2, T2, T2, T2, T2) from state information 540 collected using first trace packet 630, with (b) second chain=(T2, T2, T2, T3, T3, T3) from state information 570 collected using second trace packet 650. Based on the comparison, the suspicious transaction is "T3," particularly when applied to DR-A 507, LS2 502 and LP4 164 on host-A 110A.

Alternatively or additionally, the diagnosis may be performed by querying (see 680) further state information (see 690) from the LP3-LS1-DR-DR-LS2-LP4 datapath. In the example in FIG. 6, the queried state information includes (LP3, T2), (LS1, T2) and (DR-C, T2) from host-C 110C, and (DR-A, T3), (LS2, T3), (LP4, T3) from host-A 110A. Based on a comparison between first chain=(T2, T2, T2, T2, T2, T2) from previous state information 640 and second chain= (T2, T2, T2, T3, T3, T3) from queried state information 690, SDN manager 180 may similarly determine that the suspicious transaction is "T3." The result of the determination is then reported to the user (see 695 in FIG. 6). In practice, the performance-based assertion may be invalid due to a profile (e.g., quality of service) or policy configured on LS2 502.

Variations

Figure 7:
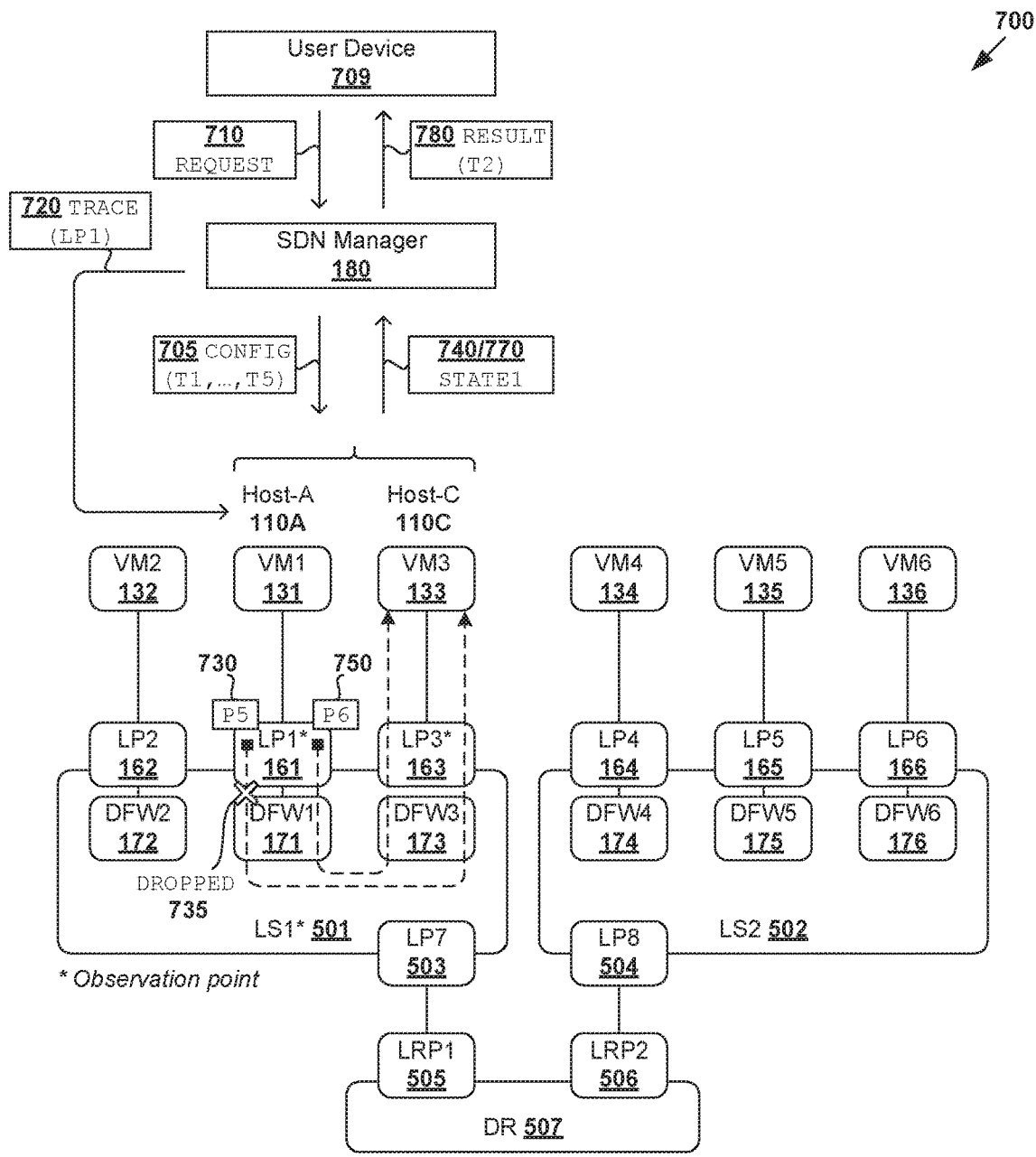
FIG. 7 is a schematic diagram illustrating a third example of configuration change monitoring in an SDN environment according to the example in FIG. 4.

FIG. 7 is a schematic diagram illustrating third example 700 of configuration change monitoring in SDN environment 100 according to the example in FIG. 4. In this example, consider a configuration change that is applicable to a datapath between VM1 131 and VM3 133. Similar to the examples in FIG. 5 and FIG. 6, SDN manager 180 may instruct host-A 110A and host-C 110C to implement a configuration change that includes multiple transactions (e.g., "T1" to "T5" at 705). During the configuration change, the datapath may be monitored to test the validity of a reachability-based assertion of "datapath=BLOCKED." Trace packets may be sent periodically from LP1 161 to LP3 163 to test whether the desired operating condition is maintained, i.e., all communication between LP3 163 to LP4 164 should be blocked.

(a) Operating Condition not Affected

A monitoring session may be initiated based on a user's request (see 710) and control information (see 720) from SDN manager 180. A first trace packet (see P5 730) may be injected at LP1 161 at a first time point. Header 732 specifies (source IP-1, destination IP-3) associated with respective VM1 131 and VM3 133, and TRACE_FLAG=1 (see 734). LP1 161 updates first trace packet 730 by adding state information (ID=LP1, STATUS=DROPPED, TID=T1, timestamp=t51) to payload 736 before dropping (see 735) first trace packet 730. In response to state information 740, SDN manager 180 determines that the configured reachability-based assertion (i.e., "datapath=UNBLOCKED") is valid.

(b) Operating Condition Affected

A second trace packet (see P6 750) may be injected at LP3 163 at a second time point. Header 752 specifies TRACE_FLAG=1 (see 754). Referring to 770 in FIG. 7, LP1 161 updates second trace packet 750 by adding (LP1, FORWARDED, T2, t61) to payload 756, followed by (LS1-A, FORWARDED, T2, t62) by LS1 501 on host-A 110A; (LS1-B, FORWARDED, T3, t63) by LS1 501 on host-C 110C; and finally (LP3, DELIVERED, T3, t64) by LP3 163. In contrast with first trace packet 730, second trace packet 750 reaches its destination even though the datapath should have been blocked. In other words, the desired operating condition has been affected.

In response to receiving state information 670, SDN manager 180 may determine that the reachability-based assertion (e.g., "datapath=BLOCKED") is invalid based on (LP3, DELIVERED, T3, t64). As such, SDN manager 180 performs a diagnosis to identify suspicious transaction(s) that have possibly unblocked the datapath. The diagnosis may involve comparing (LP1, DROPPED, T1, t51) collected using first trace packet 730 with (LP1, FORWARDED, T2, t61) collected using second trace packet 750. Based on the partial comparison, the suspicious transaction is "T2" when applied to LP1 161 on host-A 110A. In the example in FIG. 7, it is not necessary to perform blocks 495-496 in FIG. 4 to identify the culprit. The result of the determination is then reported to the user (see 780 in FIG. 7).

Container Implementation

Although explained using VMs 131-136, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as a network management entity may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network management entity to perform configuration change monitoring in a software-defined networking (SDN) environment that includes the network management entity, a first host and a second host, wherein the method comprises:
   receiving a request to monitor a datapath that includes multiple network elements to which a configuration change is applicable, wherein the multiple network elements include a first network element supported by the first host and a second network element supported by the second host;
   instructing the first host to inject, at the first network element, one or more trace packets for transmission along the datapath to the second network element;
   obtaining state information associated with the configuration change, wherein the state information is generated by at least one of the multiple network elements in response to detecting the one or more trace packets; and
   based on the state information, detecting that an operating condition associated with the datapath is affected by the configuration change.

2. The method of claim 1, wherein the method further comprises:
   in response to detecting that the operating condition is affected by the configuration change, performing a diagnosis to identify one or more transactions of the configuration change that have possibly affected the operating condition.

3. The method of claim 2, wherein performing the diagnosis comprises:
   in response to detecting that the operating condition is affected, obtaining further state information associated with the configuration change from the respective multiple network elements.

4. The method of claim 3, wherein performing the diagnosis comprises:
   identifying the one or more transactions that have possibly affected the operating condition based on one or more of the following: (a) the state information based on which the affected operating condition is detected and (b) the further state information that is obtained after the affected operating condition is detected.

5. The method of claim 1, wherein detecting that the operating condition is affected comprises:
   testing a validity of a reachability-based assertion associated with the datapath based on the state information, wherein the reachability-based assertion specifies whether the second network element is reachable from the first network element.

6. The method of claim 1, wherein detecting that the operating condition is affected comprises:

testing a validity of a metric-based assertion associated with the datapath based on the state information, wherein the performance-based assertion specifies a performance threshold to be satisfied by the datapath.

7. The method of claim 1, wherein obtaining the state information comprises:

obtaining the state information that includes one or more of the following: (a) an identifier of a transaction associated with the configuration change that has been completed at a particular network element; (b) status information associated with a particular trace packet; and (c) metric information associated with the particular trace packet.

8. A non-transitory computer-readable storage medium that includes a set of instructions which, in response to execution by a processor of a computer system, cause the processor to perform a method of configuration change monitoring in a software-defined networking (SDN) environment that includes the computer system, a first host and a second host, wherein the method comprises:

receiving a request to monitor a datapath that includes multiple network elements to which a configuration change is applicable, wherein the multiple network elements include a first network element supported by the first host and a second network element supported by the second host;

instructing the first host to inject, at the first network element, one or more trace packets for transmission along the datapath to the second network element;

obtaining state information associated with the configuration change, wherein the state information is generated by at least one of the multiple network elements in response to detecting the one or more trace packets; and based on the state information, detecting that an operating condition associated with the datapath is affected by the configuration change.

9. The non-transitory computer-readable storage medium of claim 8, wherein the method further comprises:

in response to detecting that the operating condition is affected by the configuration change, performing a diagnosis to identify one or more transactions of the configuration change that have possibly affected the operating condition.

10. The non-transitory computer-readable storage medium of claim 9, wherein performing the diagnosis comprises:

in response to detecting that the operating condition is affected, obtaining further state information associated with the configuration change from the respective multiple network elements.

11. The non-transitory computer-readable storage medium of claim 10, wherein performing the diagnosis comprises:

identifying the one or more transactions that have possibly affected the operating condition based on one or more of the following: (a) the state information based on which the affected operating condition is detected and (b) the further state information that is obtained after the affected operating condition is detected.

12. The non-transitory computer-readable storage medium of claim 8, wherein detecting that the operating condition is affected comprises:

testing a validity of a reachability-based assertion associated with the datapath based on the state information, wherein the reachability-based assertion specifies whether the second network element is reachable from the first network element.

13. The non-transitory computer-readable storage medium of claim 8, wherein detecting that the operating condition is affected comprises:

testing a validity of a metric-based assertion associated with the datapath based on the state information, wherein the performance-based assertion specifies a performance threshold to be satisfied by the datapath.

14. The non-transitory computer-readable storage medium of claim 8, wherein obtaining the state information comprises:

obtaining the state information that includes one or more of the following: (a) an identifier of a transaction associated with the configuration change that has been completed at a particular network element; (b) status information associated with a particular trace packet; and (c) metric information associated with the particular trace packet.

15. A computer system configured to perform configuration change monitoring in a software-defined networking (SDN) environment that includes the computer system, a first host and a second host, wherein the computer system comprises:

a processor; and a non-transitory computer-readable medium having stored thereon instructions that, when executed by the processor, cause the processor to:

receive a request to monitor a datapath that includes multiple network elements to which a configuration change is applicable, wherein the multiple network elements include a first network element supported by the first host and a second network element supported by the second host;

instructing the first host to inject, at the first network element, one or more trace packets for transmission along the datapath to the second network element;

obtaining state information associated with the configuration change, wherein the state information is generated by at least one of the multiple network elements in response to detecting the one or more trace packets; and based on the state information, detecting that an operating condition associated with the datapath is affected by the configuration change.

16. The computer system of claim 15, wherein the instructions further cause the processor to:

in response to detecting that the operating condition is affected by the configuration change, perform a diagnosis to identify one or more transactions of the configuration change that have possibly affected the operating condition.

17. The computer system of claim 16, wherein the instructions for performing the diagnosis cause the processor to:

in response to detecting that the operating condition is affected, obtain further state information associated with the configuration change from the respective multiple network elements.

18. The computer system of claim 17, wherein the instructions for performing the diagnosis cause the processor to:

identify the one or more transactions that have possibly affected the operating condition based on one or more of the following: (a) the state information based on which the affected operating condition is detected and (b) the further state information that is obtained after the affected operating condition is detected.

19. The computer system of claim 15, wherein the instructions for detecting the operating condition cause the processor to:

test a validity of a reachability-based assertion associated with the datapath based on the state information, wherein the reachability-based assertion specifies whether the second network element is reachable from the first network element.

20. The computer system of claim 15, wherein the instructions for detecting that the operating condition is affected cause the processor to:

test a validity of a metric-based assertion associated with the datapath based on the state information, wherein the performance-based assertion specifies a performance threshold to be satisfied by the datapath.

21. The computer system of claim 15, wherein the instructions for obtaining the state information cause the processor to:

obtain the state information that includes one or more of the following: (a) an identifier of a transaction associated with the configuration change that has been completed at a particular network element; (b) status information associated with a particular trace packet; and (c) metric information associated with the particular trace packet.

\* \* \* \* \*